(12) United States Patent
Parrish

(10) Patent No.: US 9,532,511 B2
(45) Date of Patent: Jan. 3, 2017

(54) LINE ATTACHMENT MECHANISM AND SYSTEMS AND METHODS FOR USING THE SAME

(71) Applicant: David Parrish, Visalia, CA (US)

(72) Inventor: David Parrish, Visalia, CA (US)

( * ) Notice: Subject to any disclaimer, the term of this patent is extended or adjusted under 35 U.S.C. 154(b) by 0 days.

(21) Appl. No.: 14/676,343

(22) Filed: Apr. 1, 2015

(65) Prior Publication Data

US 2016/0286735 A1    Oct. 6, 2016

(51) Int. Cl.
*A01G 9/12*      (2006.01)
*F16B 2/08*      (2006.01)

(52) U.S. Cl.
CPC ............. *A01G 9/126* (2013.01); *F16B 2/08* (2013.01)

(58) Field of Classification Search
CPC ........... A01G 9/126; A01G 9/128; F16B 2/08; B60P 7/14; B60P 7/15
USPC ...... 47/42, 43, 44, 45, 46, 47; 119/772, 777, 119/778, 779, 780, 781, 796, 803, 805, 806; 248/301, 302; 410/120, 121, 136, 156
See application file for complete search history.

(56) References Cited

U.S. PATENT DOCUMENTS

| | | |
|---|---|---|
| 23,338 A | 3/1859 | Aylesworth |
| D193,969 S | 8/1877 | Laprade |
| 313,146 A | 3/1885 | Willsie |
| 366,076 A | 7/1887 | Cleaveland |
| 442,893 A | 12/1890 | Hood et al. |
| 447,436 A | 3/1891 | Parker |
| 459,392 A | 9/1891 | Cleaveland |
| 493,432 A | 3/1893 | Kidd |
| 519,546 A * | 5/1894 | McClure ............... A44B 11/18 24/193 |
| 562,015 A | 6/1896 | Morgan |
| 598,494 A | 2/1898 | Bennett |
| 598,641 A | 2/1898 | Nelson |
| 604,302 A | 5/1898 | Clark |
| 713,730 A | 11/1902 | Willmarth |
| 735,026 A | 7/1903 | Willmarth et al. |

(Continued)

FOREIGN PATENT DOCUMENTS

| | | |
|---|---|---|
| CN | 103128699 A | 6/2013 |
| EP | 0384942 A1 | 9/1990 |

(Continued)

OTHER PUBLICATIONS

Orchard Valley Supply—In-Line Wire Tightener—downloaded Dec. 2014 from http://www.orchardvalleysupply.com/ovsstore/pc/In-Line-Wire-Tightener-15p18.htm.

(Continued)

*Primary Examiner* — Kristen C Hayes
*Assistant Examiner* — Ebony Evans
(74) *Attorney, Agent, or Firm* — Mark D. Miller; William K. Nelson

(57) ABSTRACT

The present invention provides improved attachment devices fort support lines in plant growth support systems (e.g., trellis systems) and methods of using the same, and offers significant improvements efficiency with regard to assembling and disassembling the support systems for plant and crop growth. The attachment devices may be advantageously used for various vine and low-lying plants (e.g., grapes, tomatoes, etc.) that can be grown in a trellis system or other vertical growth support system. The anchoring devices may include a wire loop for slipping over an end post and a wire strainer bracket attached to the wire loop.

20 Claims, 4 Drawing Sheets

(56) References Cited

U.S. PATENT DOCUMENTS

| | | | |
|---|---|---|---|
| 760,450 A | 5/1904 | Hall | |
| 879,959 A | 2/1908 | Halliday | |
| 1,287,050 A * | 12/1918 | Kranz | B60P 7/083 |
| | | | 254/218 |
| 1,613,791 A | 1/1927 | Forrester | |
| 1,752,029 A | 3/1930 | Robertson | |
| 1,948,845 A * | 2/1934 | De Right | H02G 7/056 |
| | | | 403/208 |
| 2,217,323 A * | 10/1940 | Sackett | A01K 27/004 |
| | | | 119/796 |
| 2,375,507 A * | 5/1945 | Van Tuyl et al. | F16B 2/065 |
| | | | 24/278 |
| 2,416,708 A | 3/1947 | Moore | |
| 2,449,235 A * | 9/1948 | Krupp | F16G 11/00 |
| | | | 24/129 D |
| 2,496,249 A | 1/1950 | Lawrence | |
| 2,761,725 A * | 9/1956 | Rushing | B66C 1/18 |
| | | | 294/75 |
| 3,175,806 A * | 3/1965 | Prete, Jr. | B60P 7/083 |
| | | | 24/68 CD |
| 3,187,686 A * | 6/1965 | De Podesta | B60P 3/073 |
| | | | 410/12 |
| 3,518,791 A * | 7/1970 | Carson | A01G 17/08 |
| | | | 24/115 R |
| 3,881,694 A * | 5/1975 | Gardner | B60P 7/083 |
| | | | 24/269 |
| 3,949,968 A | 4/1976 | Verhelst | |
| 4,336,667 A | 6/1982 | Evans | |
| 4,754,825 A * | 7/1988 | Scheffer | B66D 1/00 |
| | | | 104/173.2 |
| D347,157 S | 5/1994 | Brown | |
| 6,000,172 A | 12/1999 | Ballarino et al. | |
| 6,095,450 A | 8/2000 | Jang | |
| D438,090 S | 2/2001 | Friedman | |
| 6,293,521 B1 | 9/2001 | Parrish | |
| 6,350,088 B1 * | 2/2002 | Priester | B61D 45/00 |
| | | | 410/100 |
| 6,435,478 B2 | 8/2002 | Parrish | |
| 6,820,862 B2 | 11/2004 | Terzagi | |
| 6,932,543 B2 * | 8/2005 | Kim | E02D 5/805 |
| | | | 405/259.1 |
| 7,544,120 B1 * | 6/2009 | Tardif | A01M 31/006 |
| | | | 452/187 |
| D614,018 S | 4/2010 | McClanahan et al. | |
| 8,100,923 B2 * | 1/2012 | Paraschac | A61B 17/0467 |
| | | | 606/148 |
| 8,172,203 B2 | 5/2012 | Chou | |
| D661,562 S * | 6/2012 | Stevens | D8/44 |
| 8,225,547 B2 | 7/2012 | Debruin | |
| 8,402,611 B2 | 3/2013 | Chang | |
| D684,542 S | 6/2013 | Ledesma | |
| 2001/0052593 A1 | 12/2001 | Parrish | |
| 2004/0026678 A1 | 2/2004 | Vandergriff | |
| 2010/0051887 A1 | 3/2010 | Wooster et al. | |
| 2010/0229463 A1 | 9/2010 | Debruin | |
| 2013/0118069 A1 | 5/2013 | Hunt | |
| 2014/0250779 A1 | 9/2014 | Bortolussi | |

FOREIGN PATENT DOCUMENTS

| | | |
|---|---|---|
| EP | 1688034 B1 | 12/2007 |
| KR | 101107732 B1 | 1/2012 |

OTHER PUBLICATIONS

Orchard Valley Supply—Installing the Vineyard Trellis—online manual—downloaded Dec. 2014 from http://viticulture.hort.iastate.edu/research/pdf/installtrellis.pdf.

Kencove Farm Fence Supplies—Fastening Methods for Trellis Wire—downloaded Dec. 2014 from http://www.kencove.com/fence/125_Fastening+Methods_resource.php.

Jackson Fencing—Heavy Duty Ratchet Strainer—downloaded Dec. 2014 from https://www.jacksons-fencing.co.uk/product/sc_342000/-heavy-duty-ratchet-strainer-galvanized.aspx?tpc=BF&fmc=CC&fnc=AX&timber=0.

He, S., Embedded Tensioner, English Abstract of Chinese Patent Publication CN103128699, Jun. 5, 2013, European Patent Organization, http://www.epo.org/searching/free/espacenet.html.

Alberts, H., Clamp for a chain link wire fabric stretch bar, English Abstract of European Patent Publication EP0384942, Sep. 5, 1990, European Patent Organization, http://www.epo.org/searching/free/espacenet.html.

Hong, K.H., Growth guide equipment of vine crops, English Abstract of Korean Patent Publication KR101107732, Jan. 25, 2012, European Patent Organization, http://www.epo.org/searching/free/espacenet.html.

English Machine Translation of Chinese Patent Application Publication CN103128699 published on Jun. 5, 2013, the English Machine Translation was accessed and downloaded as early as Dec. 10, 2014 from https://www.google.com/patents/CN103128699A?cl=en&dq=CN103128699&hl=en&sa=X&ei=Ak4cVd-fCYr3oATa5IKoDw&ved=0CB0Q6AEwAA.

English Machine Translation of European Patent Application Publication EP0384942 published on Sep. 5, 1990, the English Machine Translation was accessed and downloaded as early as Dec. 10, 2014 from https://www.google.com/patents/EP0384942A1?cl=en&dq=EP0384942&hl=en&sa=X&ei=I04cVeGTCJKtogTzmoDACg&ved=0CB4Q6AEwAA.

* cited by examiner

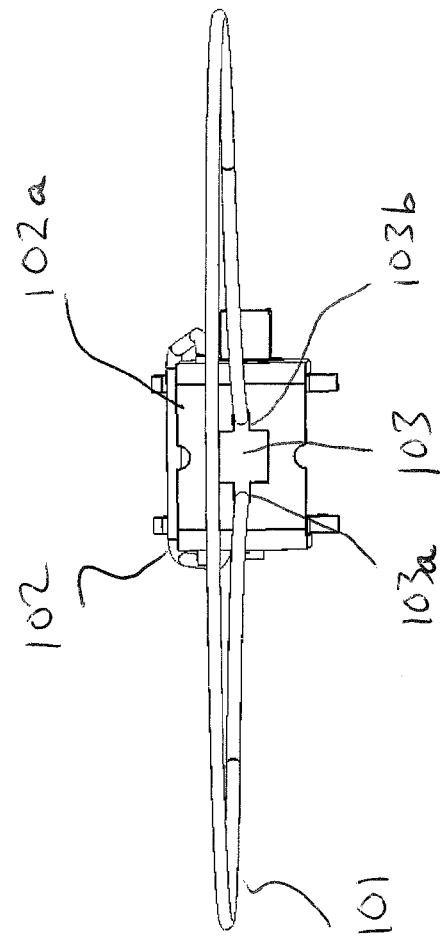
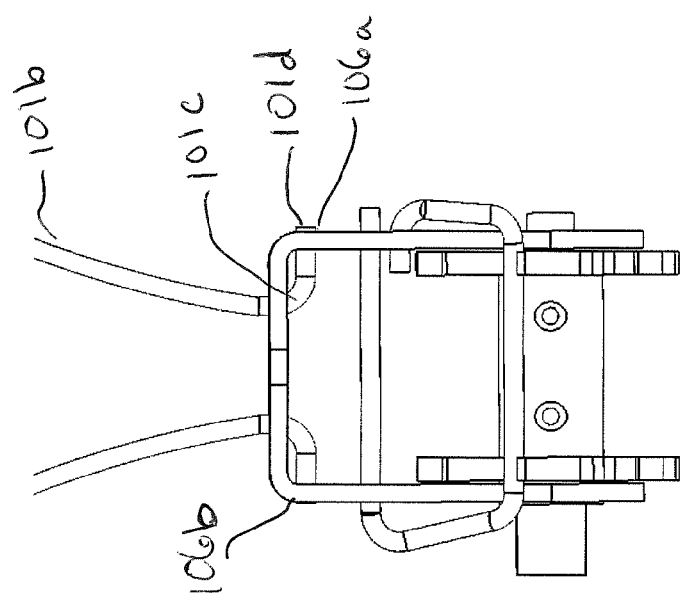
FIG. 3B
FIG. 3A

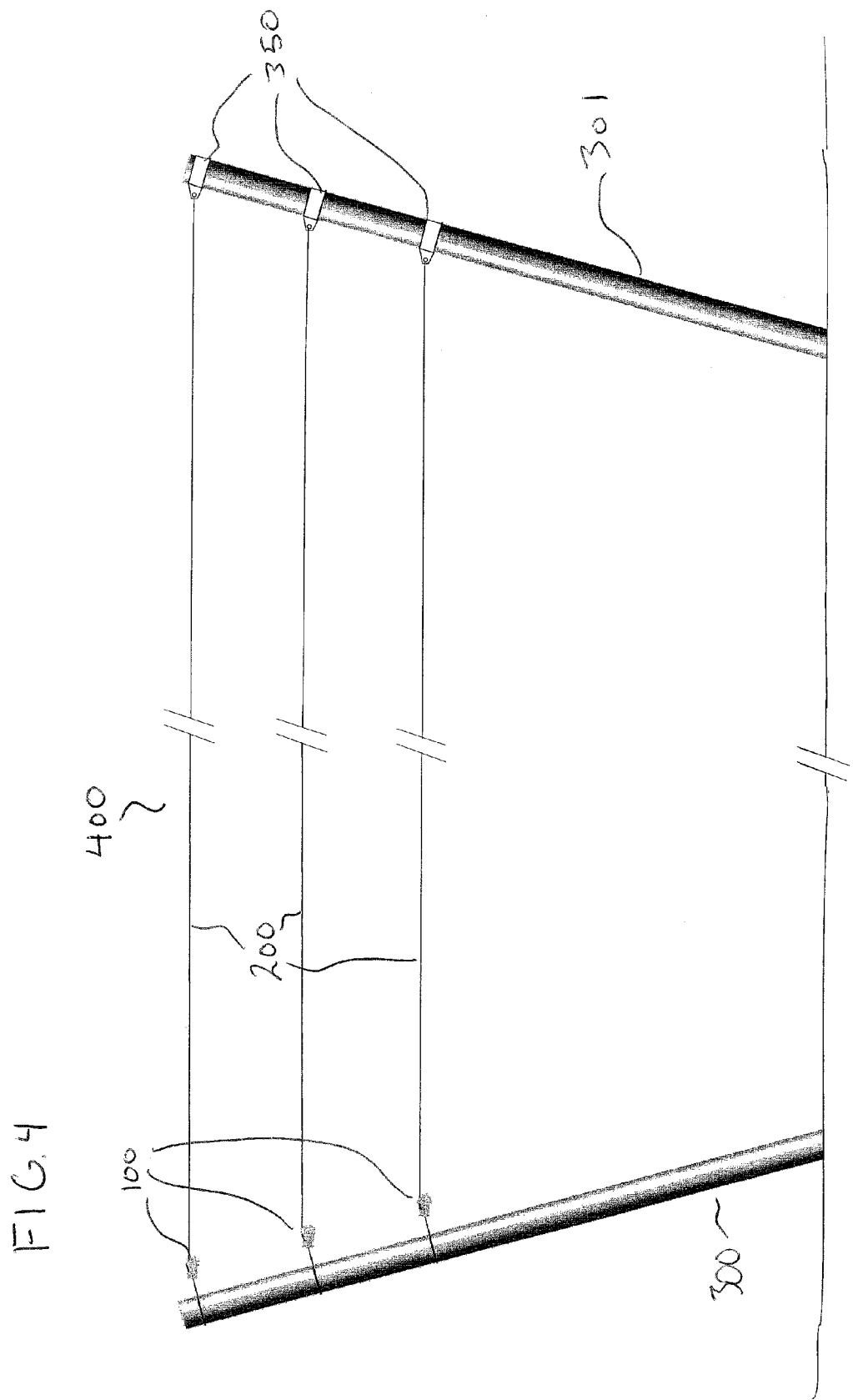

LINE ATTACHMENT MECHANISM AND SYSTEMS AND METHODS FOR USING THE SAME

FIELD OF THE INVENTION

The present invention relates to improved wire and line attachment mechanisms for plant support and trellis systems for supporting plant growth, and methods of using the same. The attachment mechanisms may be quickly and efficiently installed to decrease the time and cost of installing the plant support or trellis system.

DISCUSSION OF THE BACKGROUND

Because of the temporary nature of the growing season in some areas, requiring the rotation or alternation of crops, it is advantageous to have vertical growth supporting structures (e.g., trellis systems) that are easy to assemble, disassemble, store, and move. There are many structures and systems for the supporting the vertical growth of plants. Various combinations of poles, slats, cords and wires, as well as metal, concrete and wood structures are currently in use.

However, systems that are currently used to maintain vertical growth of certain kinds of plants (e.g., grapes, bell peppers, tomatoes, etc.) have drawbacks that have not been addressed. These systems are often difficult and time consuming to assemble. Typically, such systems include a single central set of posts with wires strung therebetween on which the plants may be trellised and trained. The wires are typically wound around each post and then tied or cinched to an end post. Both the installation and disassembly of such central post and wire systems is very labor-intensive and expensive, especially in a large growing operation.

While there are existing designs that are functional to support vertical plant growth, many have disadvantages that reduce their usefulness by being complicated, cumbersome, and difficult to assemble and disassemble. It is therefore desirable to provide devices and systems for installing plant support systems that can be more efficiently installed, removed, and stored.

SUMMARY OF THE INVENTION

The present invention provides improved wire and line attachment mechanisms (wire loop devices) that offer significant improvements in efficiency with regard to assembling and disassembling a plant growth supporting system (e.g., a trellis system), and methods of using the same. The wire loop device may quickly and easily attached wire or other support lines to a support pole or stake (e.g., an anchoring pole at the end of a crop row) and provide a means of tightening the wire or support line once the attachment mechanism is engaged with the support pole or stake.

The wire loop devices may each include a sturdy wire loop having a circular or approximately circular portion for engagement with a support pole or stake, and an anchoring portion for engagement with a wire strainer bracket. The wire loop may be made from heavy metal wire or composite material. The anchoring portions of the wire basket may each include angled or flared 90° ends or elbows (having a bend therein at an angle of about 40° to about 100°, e.g., 90° or any other angle or range of angles therein) that engage with sidewalls of the wire strainer bracket to anchor the wire loop to the wire strainer bracket. The connection between the anchoring portions of the wire loop and the strainer bracket may be sufficiently strong to prevent the wire loop from being ripped out of the wire strainer bracket under high tension.

The wire loop devices may also include a wire or line strainer for attaching to and straining trellis wire or other support lines. The strainer may include a ratcheting spool to which the wire may attached, and the spool may be cranked to tighten the attached wire or line to the desired tension without the wire or line unwinding or slipping. The ratcheting spool may have an attachment point or structure (e.g., a tang) thereon for engaging a tool (e.g., a wrench) for cranking the spool.

The combined structures of the wire loop and the wire strainer bracket can be attached to a high tensile strength support line (e.g., a trellis wire or other high tensile strength line) and easily slipped over the stake or post for anchoring the support line. The support line may then be tightened by cranking the spool. Once the support line is tightened, friction between the wire basket and the pole or stake may keep the wire basket in place on the pole or loop. The wire basket may optionally have a textured or roughened surface to increase friction between it and the post or stake.

The wire loop devices may be operable to tighten and hold the high tensile strength support line (e.g., high tensile strength plastic or polymer line, metal wire, composite line, etc.) that may be stretched along a crop row at high tension. The support line may be stretched between end posts that are positioned at opposite ends of a crop row (e.g., hundreds of feet apart). The support line may be attached at one end to the wire loop device and the wire loop device may be slipped over a first end post. The opposite end of the support line may be statically attached to the other end post. The support line may then be ratcheted onto the spool of the wire loop device such that it is sufficiently taut to support the vertical growth of plants in the crop row. Thus, the wire loop devices of the present invention may be used to support and/or train plants along an entire crop row.

The present invention offers efficiencies in the installation of vertical growth systems over conventional systems. The wire loop devices of the present invention may be used to install up a vertical growth support system (e.g., a trellis system) in a crop row quickly and efficiently without the need to wind and tighten the support line around individual poles or stakes. Thus, the present invention saves a substantial amount of time and man-hours in comparison to conventional support devices and techniques used in trellising systems.

During installation of support lines, the support lines may be laid out along the entire crop row between a first end post at one end of the crop row and a second end post at the other end of the crop row. For example, the support lines can be spooled out from a tractor, truck, or other vehicle quickly and efficiently. The end posts may be sufficiently stably anchored in the ground to withstand the high tensile stress that will be applied to them by the support line (e.g., the end posts may be driven into the ground several feet, may be angled away from the crop row, and/or may have concrete poured around the buried and base portions thereof, etc.). The first ends of the support lines may be tied, tacked, or otherwise statically attached to the first end post, and the opposite ends of the tension lines may be attached to a wire loop device of the present invention.

The wire loop portion of each wire loop device may be simply passed over the pole and each wire loop device may be placed a different vertical distance along the pole to space out the tension lines. Each support line may be attached (e.g., threaded through) the cinching mechanism in the wire loop device (e.g., a ratcheting crank) such that the support lines may be tightened to a preferred tension after the wire loop device is engaged with the second end post. Without limiting the invention, the support lines may be made from a material that allows the application of tension in a range of about 20 lbs. to about 2000 lbs. (e.g., about 50 to about 1500 lbs., about 100 to about 1000 lbs., or any other value or range of values therein). For example, and without limitation, the support lines may be made from a high-tensile strength wire (e.g., high strength, high tensile steel, etc.), polymer material (e.g., aromatic polyamide fibers, PBO, etc.), composite material, etc.

Prior to applying high tension to the support lines, the support lines may be attached to trellis structures or other support structures installed along crop row by clips or other fasteners (e.g., wire ties, zip ties, etc.) or may simply be popped into open loop structures (e.g., open rings or slots) in the support structures along the crop row. The support lines may be partially tightened prior to being attached to the support structures along the crop rows. After the support lines are attached to the support structures, the support lines may be tightened to full tension. Once the predetermined desired tension is established the installation of the plant support or trellis system may be complete.

The present wire loop devices may also be used in plant support systems that utilize multiple sets or groups of support lines. For example, and without limitation, some plant support systems may use laterally spaced support lines that flank or run parallel to a crop row to support vertical growth of the crop plants and/or to prevent or limit low-lying lateral crop growth along the ground. Such systems may have two laterally spaced sets of terminal poles that flank each end of the crop row. The wire loop devices of the present invention may be used to connect support lines to such lateral terminal poles and apply tension to the support lines. The wire loop devices of the present invention are not limited to the applications discussed herein and other applications and uses of the wire loop devices are within the scope of the present invention.

The advantages of the present invention are further illustrated by the embodiments described herein. It is to be understood that there are several variations in the trellis system, and that the embodiments described herein are presented for purposes of illustration and description. They are not intended to be exhaustive or to limit the invention to the precise forms disclosed.

In some embodiments, and without limitation, the present invention relates to an attachment device that includes a wire loop having a loop portion and two attachment portions, the loop portion having a circular open loop shape for engaging an anchoring post, and the two attachment portions each having an extension portion and an anchor, the anchor having an angle in a range of about 40° to about 100° relative to the extension portion; a wire strainer bracket having first and second sidewalls and a rear wall connecting the first and second sidewalls, where the two attachment portions pass through a passage in the rear wall and each of the anchors engage with one of the sidewalls; and a spool for attaching and tightening a support line for supporting vertical growth of a plant. The wire loop may include a heavy gage metal wire that can maintain its shape and engagement with the sidewalls of the strainer bracket under high tension. The wire loop may withstand the support line being tightened to a tension in a range of 20 lbs. to about 2000 lbs. (e.g., about 50 to about 1500 lbs., about 100 to about 1000 lbs., or any other value or range of values therein). The anchor may have an angle of about 90° relative to the extension portion.

The engagement of the anchors of the wire loop with the sidewalls may be sufficiently strong to prevent pullout of the anchors under tension in the above range. The wire strainer may include a first hole in the first sidewall and a second hole in the second sidewall, where the anchors engage with the first and second holes. The wire loop may be made from a rigid metal or composite material. The passage in the rear wall may include two lateral slots, each for receiving the extension portion of one of the attachment portions of the wire loop. The lateral slots may prevent vertical or outward movement of the attachment portions of the wire loop relative to said wire strainer bracket.

The spool of the attachment device may include a gear that may function as a portion of a ratchet mechanism. The ratchet mechanism may further include a pawl, such as a spring attached to the wire strainer bracket, where the spring engages with the teeth of the gear.

In some embodiments, and without limitation, the present invention relates to an attachment device for connecting a plant support line to an end post to thereby suspend the support line over a crop row, the attachment device including an open wire loop structure having a substantially circular portion for engaging with the end post, and first and second anchoring portions having laterally flared ends; and a wire strainer bracket for applying tension to the support line, the wire strainer bracket having two lateral sidewalls, each sidewall having an anchor receiving hole, and each anchor receiving hole having one of the first and second flared ends inserted therein, the wire strainer bracket further including a rear wall connecting the two lateral sidewalls, the rear wall having a passage with first and second lateral slots, the lateral slots having a width slightly larger than a diameter of the anchoring portions of the open wire loop structure and the first anchoring portion is positioned within the first lateral slot and the second anchoring portion is positioned within the second lateral slot, where the connection between the open wire loop structure and the wire strainer bracket is sufficiently strong to withstand separation when the strainer bracket applies a tension to the support line of up to 2000 lbs.

In some embodiments, and without limitation, the present invention relates to a method of installing a plant support system that includes laying out a plurality of support lines along a crop row, attaching a first end of each of said plurality of support lines to an attachment device as described herein, attaching a second end of each of the plurality of support lines to an first end post, engaging the wire loops of each of the attachment devices with a second end post, and applying a predetermined tension to each of the support lines using the attachment devices. Such embodiments may further include installing in the ground a plurality of vertical support structures along the crop row between the first and second end posts, each of the plurality of vertical support structures having a plurality of support line receivers thereon, the support line receivers being open loop structures with which the support lines may engaged without having to longitudinally thread the support lines through the support line receivers.

In some embodiments, and without limitation, the present invention relates to a method of installing a plant growth support system, including laying out a plurality of retaining lines along a crop row; attaching a first end of each of the plurality of support lines to a first terminal post at a first end of said crop row; individually attaching a second end of each of the plurality of support lines to one of a plurality of wire loop devices; placing the wire loop devices on a second terminal post at a second end of the crop row; and tightening the support lines using the wire loop devices to tension in a range of about 20 lbs. to about 2000 lbs.

It is an object of the present invention to provide a tensioning device for trellis or plant support systems that allows the system to be quickly and efficiently installed for growing trellised crops.

It is also an object of the present invention to provide a tensioning device that can be quickly slipped over an anchoring pole at the end of a crop row.

It is also an object of the present invention to provide a tensioning device that can apply high tension to trellis wires or other plant support lines without failure of the tensioning device.

It is also an object of the present invention to provide a method of installing trellis wires or other support lines on a trellis and support system that reduces the installation time of the trellis or support system.

Additional aspects and objects of the invention will be apparent from the detailed descriptions and the claims herein.

BRIEF DESCRIPTION OF THE DRAWINGS

FIG. 3A is an overhead view of a wire strainer bracket of an attachment device according to an embodiment of the present invention.

FIG. 3B is an anterior view of a wire strainer bracket of an attachment device according to an embodiment of the present invention.

FIG. 4 is a side view of a plant growth system according to an embodiment of the present invention.

DETAILED DESCRIPTION

Figure 1:
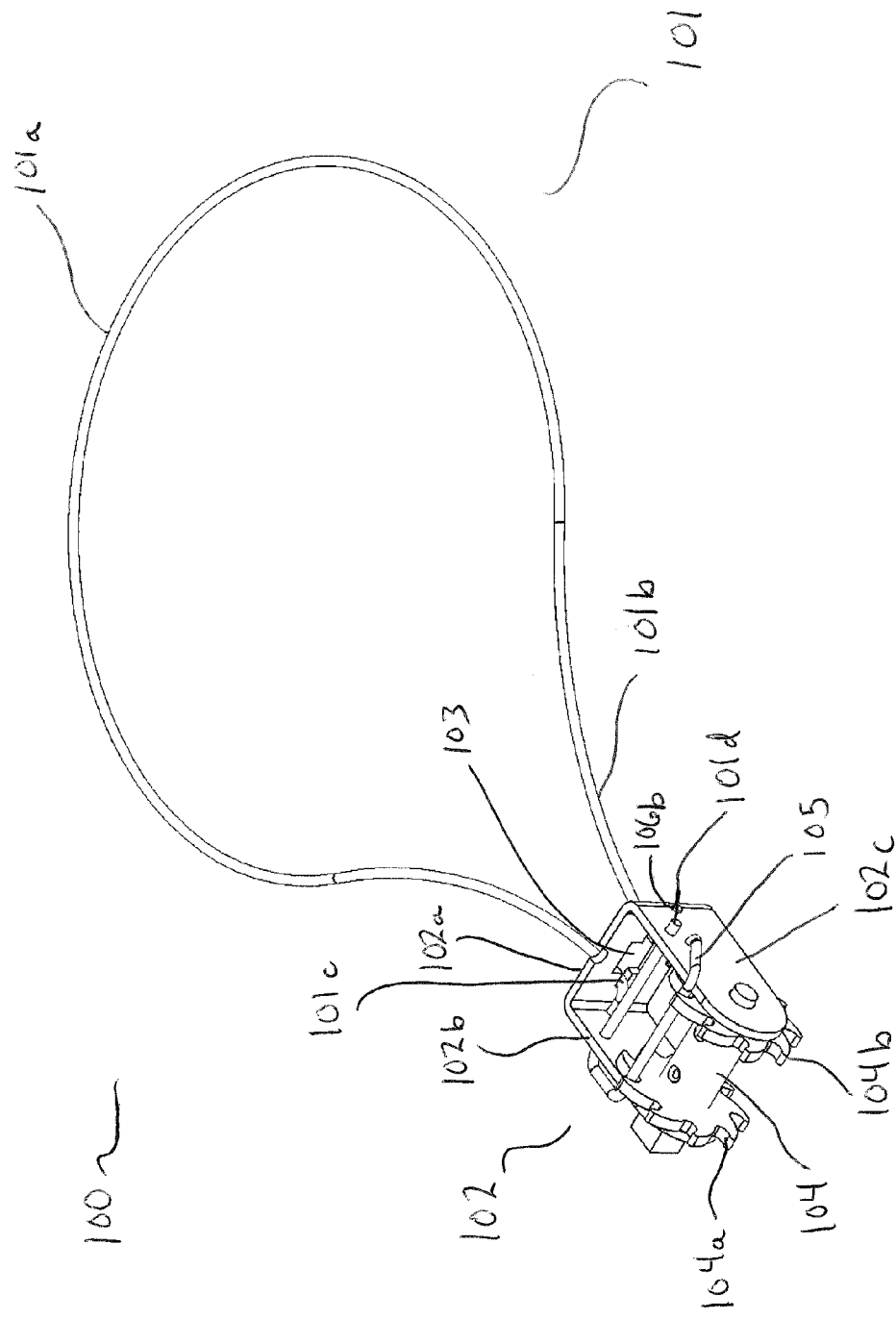
FIG. 1 is a perspective view of an attachment device according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

Referring to the drawings wherein like reference characters designate like or corresponding parts throughout the several views, and referring particularly to FIGS. 1-4, it is seen that the present invention includes various embodiments of a wire loop tensioning device for connecting to and applying tension to a support line (e.g., a trellis wire). It is also evident in the drawings that the invention includes methods of using the wire loop devices.

Without limiting the invention, FIG. 1 shows an exemplary embodiment of a wire loop device 100 according to an embodiment of the present invention. Wire loop device 100 includes a wire loop structure 101 which may engage with a support post or stake of a trellis or plant growth support system, and a wire straining bracket assembly 102. The wire loop structure 101 may include an open circular portion referred to herein as the loop 101a, as well as extensions 101b that may be inserted into the wire straining bracket assembly 102. The extensions 101b may each have anchors 101c that may each include angled ends or elbows 101d (having an angle in a range of about 40° to about 100°, e.g., 90° or any other angle or range of angles therein) that engage with sidewalls of the wire strainer bracket to anchor the wire loop 101 to the wire strainer bracket assembly 102. The connection between the anchoring portions of the wire loop and the strainer bracket may be sufficiently strong to prevent the wire loop from being ripped out of the wire strainer bracket under high tension.

The wire loop 101 may be made from strong metal wire or composite material. For example, and without limitation, the wire loop may be made from a high tensile strength steel rod. In some implementations, and without limitation, the wire loop structure may have a partially or wholly textured surface (e.g., without any coating over the metal loop) that increases friction and bite between the wire loop structure and the pole or other structure with which it may be engaged. Such surface textures may include a ground surface (e.g., a non-reflective unidirectional texture), brushed or dull polished surface, satin-polished (special non-reflective finish that may be corrosion resistant in external conditions), etc. Without limiting the invention, the wire loop may have a textured surface having a roughness average (Ra-μm) in a range of about 0.1 to about 1.5 (e.g., about 0.3 to about 1.0, or any value or range of values therein). In further implementations, and without limitation, additional materials may be included in the wire loop structure such as a polymer anti-weathering coating, a high friction polymer coating material to increase the friction between the wire loop and the pole or other structure with which is engaged, etc.

As shown in FIG. 1, and without limitation, the strainer bracket assembly 102 may have a U-shaped structure that includes a rear wall 102a and first and second sidewalls 102b and 102c. The rear and side walls may be integrally formed, providing structural strength. The strainer bracket assembly 102 may further include a spool 104 that includes lateral gear wheels 104a and 104b. The strainer bracket assembly may also include a spring 105 that engages with one or both of the gear wheels 105a and 105b.

Figure 2:
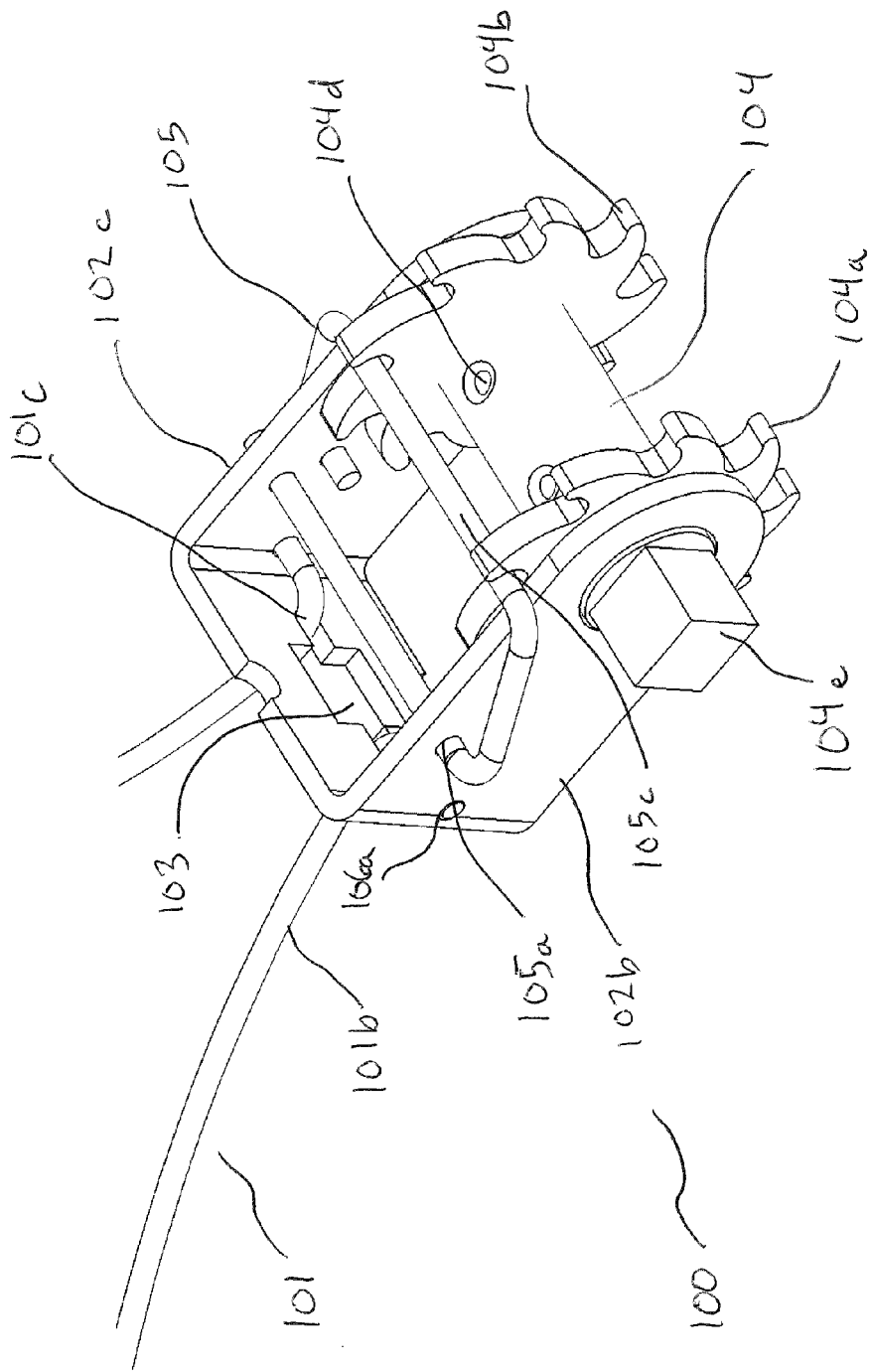
FIG. 2 is a perspective view of a wire strainer bracket of an attachment device according to an embodiment of the present invention.

FIG. 2, without limiting the invention, shows a close-up view of an exemplary strainer bracket assembly 102 to provide a clearer view of the components thereof. The spool 104 and the spring 105 may work together as a ratcheting mechanism. The spring 105 includes two static anchoring portions 105a and 105b that may engage with receiving holes in the bracket sidewalls 102b and 102c, and an engagement bar 105c that is operable to engage with the teeth of the gear wheels 104a and 104b. The spring may be deformable and resilient such that it is displaced as the spool and gears are turned and resiles into engagement with the teeth of the gears when the gears are in a static position. The spool 104 includes a shank or tang 104e that may be engaged with a tool (e.g., a socket wrench, a crescent wrench, pliers, etc.) to rotate the spool 104 and tighten a tension line attached to the spool 104. The spool 104 may include holes 104d for threading and anchoring tension lines to the spool prior to applying tension to the tension lines.

FIGS. 3A and 3B, without limiting the invention, show a close-up view of the interconnection of the anchoring portions 101c of the wire loop 101 and the strainer bracket 102. The two attachment portions 101c may pass through an opening 103 in the rear wall 102a of the strainer bracket. The opening in the rear wall of the strainer bracket may have a specialized shape that allows the attachment portions of the wire loop to passed through the opening and also engage with narrow lateral slots therein. For example, the opening 103 includes lateral slots 103a and 103b that have a vertical dimension that is slightly larger than the diameter of the two attachment portions 101c of the wire loop 101. The shape of the opening 103 may allow the attachment portions to be squeezed together and passed through the opening 103, and to then be slotted into the lateral slots 103a and 103b after they are passed through the opening 103. Additionally, the angled portions 101d of the two attachment portions 101c may simultaneously be inserted into lateral holes 106a and 106b in the lateral walls 102b and 102c of the strainer bracket. The combination of the insertion of the angled ends 101d of the wire loop 101 and the insertion of the attachment portions 101c into the lateral slots 103a and 103b provides a stable connection between the wire loop 101 and the strainer bracket. The interaction of the attachment portions 101c and the lateral slots 103a and 103b prevents the wire loop from shifting or rotating up or down along a vertical plane. Also, the angle of the attachment portions 101c of the wire loop may be positioned to abut the lateral slots 103a and 103b in the rear wall 102a of the strainer bracket such that as tension is applied to the wire loop 101, the angle applies pressure against the rear wall 102a. The pressure between the attachment portions 101c and the rear wall 102a and the pressure between the angled portions 101d and the holes 103a and 103b may prevent disformation of the attachment portions 101c (e.g., straightening of the angled portions 101d). Additionally, the wire loop may include a heavy gage metal wire that can maintain its shape and engagement with the sidewalls of the strainer bracket under high tension.

The wire loop device of the present invention may be used in a crop support system for supporting crop plants (e.g., grapes, bell peppers, tomatoes, flowers, onions, garlic, peas, etc.) using high tension support lines. One advantage of using the wire loop device of the present invention is that the support lines may be laid out along the entire crop row and attached quickly and efficiently to end poles or posts at each end of a crop row, without the need to tie each of the support lines to each of a multitude of trellises or other support structures between the end posts. The present wire loop device allow the retaining lines to be suspended at high tension along the crop row without the need for additional support between the end posts. In some embodiments, and without limitation, the high tension support lines may be engaged with trellises or other support structures between the end posts. The trellises or other support structures may have support line receivers that may be open ring or slot structures that allow the support lines to be placed within the receivers without having to be threaded through the receiver longitudinally. The open structure of the retainers allows the support lines to be laid out along the crop row and engaged with the end poles before being inserted into the support line receivers. The avoidance of having to thread the ends of the support lines through the support line receivers saves a substantial amount of labor and time in the process of installing the crop support system. Once the support lines are routed through the support line receivers, the support lines may be tightened by the wire loop devices to a preferred tension thereby providing scaffolding upon which the plants in the crop row may be supported during growth.

Without limiting the invention, FIG. 4 shows a view of an exemplary crop support system 400 that includes multiple wire loop devices 100 of the present invention. The support lines 200 (e.g., high tension lines) may be strung between anchoring end posts 300 and 301 (the breaks shown in the support lines 200 and the ground indicate that the length of the support lines and the distance between the end posts 300 and 301 may vary). The support lines 200 may be attached at one end by tying or mechanical anchoring to an end post 301 at a first end of a crop row. Mechanical couplers 350 may be used to connect the support lines to the end post 301. Mechanical couplers 350 may include one or more devices to resist slippage or shearing of the high tensile line (e.g., a crimp sleeve for receiving the support line, etc.). The other end of the support lines 200 may each be attached to a spool of one of the wire loop devices 100, as described herein. The wire loop of the wire loop device 100 may then be engaged with the end post 300 at a second end of the crop row.

Once the attachment devices are engaged with the anchoring pole, the ratcheting mechanism made up of the spool 104 and the spring 105 may be ratcheted to tighten the retaining lines 200. The retaining lines may be made from a material that allows the application of tension in a range of about 20 lbs. to about 2000 lbs. (e.g., about 100 to about 1000 lbs., or any value or range of values therein). For example, and without limitation, the retaining lines may be made from a high-tensile strength wire (e.g., high strength, high tensile steel, etc.), polymer material (e.g., aromatic polyamide fibers, PBO, etc.), composite material, etc.

The wire loop devices 100 may tighten the support lines 200 sufficiently to suspend the support lines with substantially no sag when crop plants are attached to and/or rest on the support lines 200. The attachment devices may be tightened using a manual or motorized cranking tool or other leverage device (e.g., a socket wrench, a crescent wrench, pliers, an electric driver, etc.; not shown) to apply the preferred tension to the support lines.

The tension applied to the support lines 200 may require that the end posts 300 and 301 be strongly secured, so that they are not uprooted and do not collapse toward one another. The end posts may be driven several feet into the ground (e.g., to a depth in a range of about two feet to about five feet, or any value or range of values therein) and may be angled away from the crop row in order to withstand the tension applied to the support lines 200. The end posts 300 and 301 may also include features that prevent them from being uprooted themselves. For example, and without limitation, the end posts may include one or more plates along the buried portion thereof that provide more surface area against the soil. For example, and without limitation, the end posts may be tee posts with foot plates attached thereto.

In some embodiments, a plurality of trellises or other vertical support structures may be set up in the crop row and spaced at regular or varying distances along the crop row. For example, and without limitation, the vertical support structures may be spaced apart by a distance in a range of about 10 feet to about 40 feet (e.g., about 15 to about 30 feet, about 20 to about 25 feet, or any value or range of values therein). The vertical support structures may have one or more support line receivers (e.g., clips, rings, etc.) vertically spaced to each engage support lines at different heights from the ground. The support line receivers may have one or more incomplete or open rings or loops through which the support lines can be strung. Once the support lines are routed through the support line receivers, the retaining lines may be tightened by the wire loop devices to a preferred tension thereby providing scaffolding upon which the plants in the crop row may be supported during growth. The support lines may be strung through the support line receivers to help to maintain the positions of the support lines against forces applied by the crop plants as they grow. However, it is to be understood that the tension in the support lines may be sufficient to support the crop plants without the addition of vertical support structures, such as trellises.

The present invention provides a plant growth support system (e.g., a trellis system) that may be laid out in a more efficient way than conventional support systems, while still being structurally sound. According to methods of the present invention, the support lines may be laid out along an entire crop row, attached to the end posts, and tightened to a high tension without the need for attachment to an intervening structure. Sufficient tension may be applied to the support lines to enable the support lines to support the vertical growth of the cops planted in the crop row.

In other embodiments, and without limitation, the support system may include vertical support structures between the end posts, and the support lines may be laid out along the entire crop row prior to, during, or after the installation of the vertical support structures. For example, the support lines may be spooled out along the crop row from a tractor, truck, or other vehicle quickly and efficiently without having to thread the ends of the support lines through closed-loop structures on a trellis or support structure or having to wrap tie the line around the trellis or support structure. The vertical support structures may be driven into the ground either before or after the support lines are laid out. The end posts may be present at each end of the crop row to provide an anchor to the high tension support lines.

Once the vertical support structures are in position, the support lines can be statically attached to a first end post at one end thereof and to a wire loop device of the present invention at the other end thereof. The wire loop devices may then be slipped onto and engaged with the adjacent end post and tension may then be applied to the support lines by cranking the ratcheting mechanisms on each of the wire loop devices.

Prior to tightening the support lines to the preferred tension, the lines may be placed into the support line receivers on the vertical support structures, which may aid in maintaining the position of the support lines along the crop row. Once the support lines are positioned in the support line receivers, the support lines may be tightened to the desired (e.g., predetermined) tension to establish the high tension support lines in a sturdy and weight-bearing condition. Once the desired tension is established the installation of the support system may be complete.

With the support system installed and the support lines tightened, crop plants may be grown and trained (e.g., manually placed on the support lines and vertical support frames) over the growing season so that the plants are maintained in a vertical posture.

In further embodiments, the design of the plant growth support system of the present invention may reduce the number of vertical support structures (trellises) that are used in conventional support systems. The high-tension support lines may provide added structural support that allows for relatively large gaps between adjacent vertical support structures. For example, the vertical support structures may be spaced apart by a distance in a range of about 10 feet to about 100 feet (e.g., about 20 feet to about 80 feet, or any other value or range of values therein). Also, the vertical support structures may not need to be inserted into the soil as deeply as trellis stakes or other support structures of conventional plant support systems. The relatively shallow depth to which they are inserted may allow them to be inserted into the soil quickly. For example, and without limitation, the vertical support structures may be installed quickly with only a mallet or other driving tool.

The present invention provides an attachment mechanism for a support system for vertical plant growth and method of installing the same that requires less time to assemble than conventional systems, without sacrificing the structural strength and integrity. It is to be understood that here are several variations in the attachment mechanisms, and that the foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed:
1. An attachment device, comprising:
 a. a wire loop having a loop portion and two attachment portions, wherein
  i. said loop portion has a circular open loop shape for engaging an anchoring post;
  ii. said loop portion is rigid and maintains its shape and diameter under tension; and
  iii. said two attachment portions each having an extension portion and an anchor, said anchor having an angle in a range of about 40° to about 100° relative to said extension portion;
 b. a wire strainer bracket having first and second sidewalls and a rear wall connecting the first and second sidewalls, wherein said two attachment portions pass through a passage in said rear wall and each of said anchors engage with one of said sidewalls and connect said wire loop to said wire strainer bracket without any additional connection points between said wire loop and said wire strainer bracket; and
 c. a spool for attaching and tightening a support line for supporting vertical growth of a plant wherein said spool is rotatably connected to said first and second sidewalls of said wire strainer.

2. The attachment device of claim 1, wherein said wire loop comprises a heavy gauge metal wire or a rigid composite material, and has an internal diameter that is substantially greater than the outer diameter or width of said anchoring post.

3. The attachment device of claim 1, wherein said anchor has an angle of about 90° relative to said extension portion.

4. The attachment device of claim 1, wherein said attachment device can tighten said support line to a tension in a range of about 20 lbs. to about 2000 lbs.

5. The attachment device of claim 4, wherein said tension creates sufficient friction to hold said wire loop in place on said anchoring post.

6. The attachment device of claim 1, wherein said attachment device can tighten said support line to a tension in a range of about 500 lbs. to about 1500 lbs.

7. The attachment device of claim 1, wherein said attachment device can tighten said support line to a tension in a range of about 1000 lbs. to about 2000 lbs.

8. The attachment device of claim 1, wherein said engagement of said anchors with said sidewalls is sufficiently strong to prevent pullout of said anchors under a tension in a range of about 20 lbs. to about 2000 lbs.

9. The attachment device of claim 1, wherein said spool comprises a gear which functions as a portion of a ratchet mechanism.

10. The attachment device of claim 9, further comprising a spring attached to said wire strainer bracket which functions as a pawl of said ratchet mechanism, wherein said spring engages with a set of teeth of said gear.

11. The attachment device of claim 1, wherein said passage in said rear wall includes two lateral slots, each for receiving said extension portion of one of said attachment portions, and said lateral slots prevent vertical movement of said attachment portions of said wire loop relative to said wire strainer bracket.

12. The attachment device of claim 1, further comprising a first hole in said first sidewall and a second hole in said second sidewall, wherein said anchors engage with said first and second holes.

13. The attachment device of claim 1, wherein said loop portion comprises a textured surface for engagement with said anchoring post.

14. An attachment device for connecting at least one plant support line to an end post to thereby suspend said at least one support line over a crop row, the attachment device comprising:
  a. an open wire loop structure having a substantially circular portion for engaging with said end post, and first and second anchoring portions having laterally flared ends; and
  b. a wire strainer bracket for applying tension to said support line, said wire strainer bracket having a spool, two lateral sidewalls, each sidewall having an anchor receiving hole, and each anchor receiving hole having one of said first and second flared ends inserted therein, said wire strainer bracket further including a rear wall connecting said two lateral sidewalls, said rear wall having a passage having a central opening with first and second lateral slots, said lateral slots having a width slightly larger than a diameter of said anchoring portions of said open wire loop structure and said first anchoring portion is positioned within said first lateral slot and said second anchoring portion is positioned within said second lateral slot, wherein the connection between said open wire loop structure and said wire strainer bracket is sufficiently strong to withstand separation when said strainer bracket applies a tension to said support line of up to 2000 lbs., wherein said first and second lateral slots prevent vertical movement of said anchoring portions of said open wire loop structure relative to said wire strainer bracket, and said substantially circular portion of said open wire loop structure substantially maintains its shape when said tension is applied to said support line.

15. The attachment device of claim 14, wherein said spool is a ratcheting spool for connecting to said at least one plant support line and applying tension to said at least one plant support line.

16. The attachment device of claim 14, wherein said laterally flared ends each have an angle in a range of about 70° to about 100° relative to said anchoring portion.

17. The attachment device of claim 14, wherein said laterally flared ends each have an angle in a range of about 90° relative to said anchoring portion.

18. The attachment device of claim 14, wherein said wire loop comprises a heavy gauge metal wire or a rigid composite material, and said wire loop has an internal diameter that is substantially greater than the outer diameter or width of said end post.

19. A method of installing a plant support system, comprising:
  a. laying out at least one support line along a crop row;
  b. attaching a first end of said at least one support line to an attachment device of claim 1;
  c. attaching a second end of said at least one support line to a first end post;
  d. engaging the wire loop of said attachment device with a second end post; and
  e. applying a predetermined tension to said at least one support line using said attachment device.

20. The method of claim 19, wherein said predetermined tension is in a range of about 20 lbs. to about 2000 lbs.

* * * * *